Dec. 24, 1929.   J. F. MacKAY   1,740,516
EGG TURNING MEANS FOR INCUBATORS
Original Filed Jan. 7, 1928   2 Sheets-Sheet 2
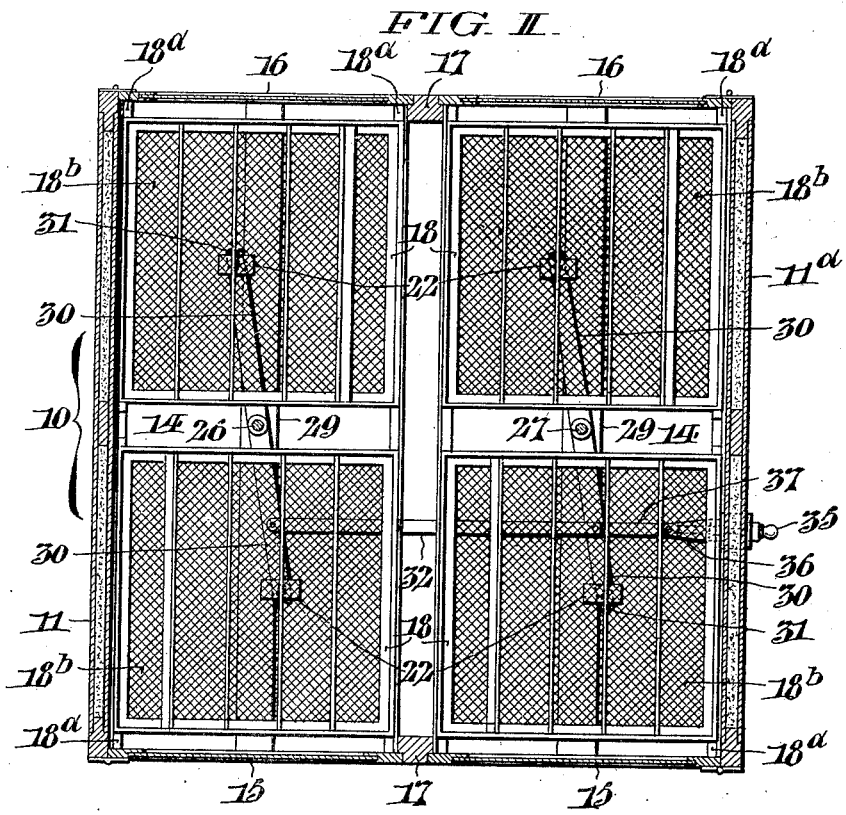
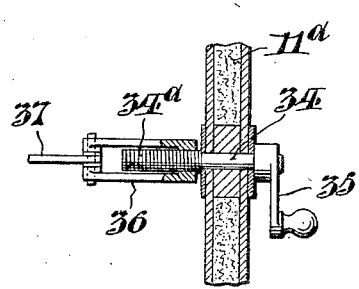
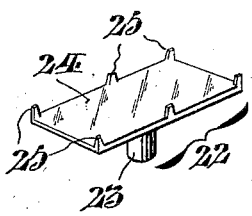
WITNESSES
John A. Weidler
George M. Murchamp
INVENTOR:
John F. MacKay,
BY Fall yo Paul
ATTORNEYS.

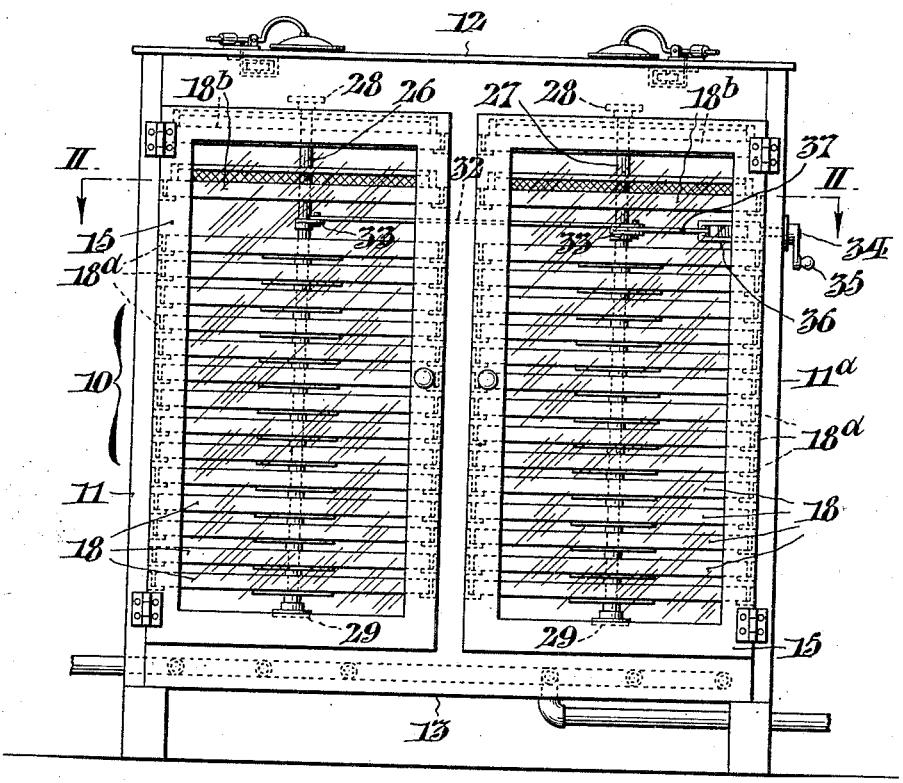
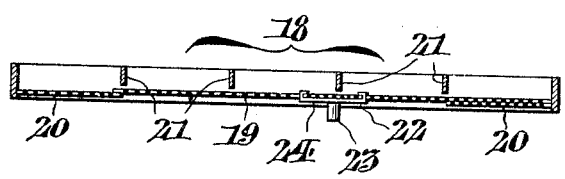

Patented Dec. 24, 1929

1,740,516

UNITED STATES PATENT OFFICE

JOHN F. MacKAY, OF LANCASTER, PENNSYLVANIA

EGG-TURNING MEANS FOR INCUBATORS

Original application filed January 7, 1928, Serial No. 245,077. Divided and this application filed November 3, 1928. Serial No. 316,923.

This invention relates to incubators, more particularly to upright or "cabinet" incubators wherein a multiplicity of egg trays are arranged in superposed relation, as distinguished from the type of incubators in which individual chambers for the egg trays are disposed in horizontal sequence: and the present subject-matter is a "division" from my co-pending application, Serial Number 245,077, filed January 7th, 1928.

The present invention is mainly directed toward provision, in incubators embodying the features outlined, of simple and reliable mechanism for simultaneously turning the eggs which will permit individual disconnection and removal of the trays without necessity for disturbing others.

How the foregoing and other objects and advantages may be readily realized in practice will be manifest from the detailed description which follows of the typical embodiment of my invention illustrated in the accompanying drawings.

Fig. I is a front elevation of an incubator embodying the present improvements.

Fig. II is a plan seition taken approximately as indicated by the arrows II—II in Fig. I, and showing more fully the novel means whereby the eggs are turned in the trays.

Fig. III is a sectional view of one of the egg trays on a somewhat larger scale.

Fig. IV is a fragmentary sectional view featuring some of the details associated with the egg-turning mechanism; and, Fig. V is a perspective view of one of the actuating lug members, which I provide for use in connection with the trays to effect turning of the eggs in them.

With reference first more especially to Figs. I and II, it will be observed that my improved incubator comprises an enclosure 10 of the upright or cabinet type with insulated side walls 11, 11ª, a top 12, and a bottom 13, jointly affording a chamber 14 within for the purposes of incubation. This chamber 14 is closed at the front and back of the structure by double doors indicated at 15, 16, in Fig. II, said doors closing against upright jambs or posts 17 extending from the top 12 to the bottom 13. As shown in Fig. II, the cabinet 10 is square in plan and of ample area to accommodate a multiplicity of vertically-spaced egg trays 18 grouped, in the present instance, into four symmetrically-arranged stacks with pairs of such stacks accessible from opposite sides of the enclosure through the doors 15, 16. The trays 18 are slidingly supported upon transversely-extending angle guides 18ª, whereof the outer ones are secured to the side walls 11, 11ª of the enclosure 10, while the inner ones are secured at opposite ends to the jamb posts 17. The upper two trays 18ᵇ of each stack are reserved for hatching and are, therefore, spaced further apart vertically than the others.

Fresh air enters the incubator chamber 14 at the bottom in accordance with the disclosure in my co-pending application hereinbefore referred to, and is conducted to the middle of said chamber for distribution upward centrally of the tray stack group, as well as radially outward toward the sides of said chamber.

As shown in Figs. II and III, the trays 18 are of the type embodying a shiftable egg-turning bottom section 19 constructed of wire mesh with reinforced edges, said section moving over similarly-constructed fixed end-filler pieces 20. Each tray 18 is also equipped at intervals with removable cross bars 21 to prevent bodily movement of the eggs incidental to being turned through shifting of the bottom section 19—all as well understood in the art. For the purpose of actuating the sliding bottom sections 19 of the trays 18 in accordance with my invention, I provide lug members 22, one of said members being illustrated in perspective in Fig. V. Each lug member 22 comprises a projection 23 depending from an anchorage plate 24 with a number of upstanding tongues 25 adapted to penetrate the wire mesh of the sliding bottom section 19 of the tray 18 and to be bent over in opposite directions to secure the lug member 22 in place, as shown in Fig. III.

The mechanism for turning all the eggs in the trays 18 at one time includes a pair of vertical shafts 26, 27 which are located in the intervals between the two tray stacks at each side of the structure, said shafts having journal bearing top and bottom in beams 28, 29 extending transversely of the chamber 14. From Figs. I and II it will be observed that the shafts 26, 27 are equipped with double arms 30 whose extremities reach horizontally outward in opposite directions through the interspaces between the egg trays 18 of contiguous, with regard to front and rear of the structure, stacks. These arms 30 have their outer ends bifurcated as at 31 (Fig. II) to engage the depending projections 23, of the lug member 22 on the movable bottom sections 19, of the trays 18. It will also be noted that the shafts 26, 27 are coordinated for concurrent actuation by a coupling bar 32, which connects a pair of auxiliary arms 33 secured to them. Journalled for rotation in the right hand wall 11$^a$, of the cabinet 10, is a shaft 34 to the outer or protruding end of which is secured a crank handle 35. The inner end of this shaft 34 is threaded as at 34$^a$ to engage a follower 36 having a link connection 37 with the coupling bar 32. By rotating the crank handle 35 in one direction or the other, it will be obvious that, through the various interposed connections just described, the sliding bottom sections 19 of the trays 18 will be correspondingly shifted with resultant simultaneous turning of all the eggs in the incubator; those in the hatching trays 18$^b$ being, of course, excepted.

From the foregoing the operation of my novel egg-turning means will be well understood and that, throughout the incubation period the eggs are periodically turned at regular intervals, after established practice, by turning the crank handle 35 first in one direction and then in the other, as already explained.

Having thus described my invention, I claim:

1. An incubator embodying an enclosure to house a multiplicity of vertically-spaced egg trays arranged in groups of stacks, a shiftable egg-turning bottom section in each tray, vertical shafts extending down between pairs of the tray stacks, and having arms reaching in opposite directions to the shiftable bottom sections on the trays of each pair of stacks, and means co-ordinating the several shafts for joint operation from the exterior of the incubator to simultaneously turn all the eggs in the trays.

2. An incubator embodying an enclosure to house a multiplicity of vertically-spaced egg trays arranged in a group of stacks, a shiftable egg-turning bottom section in each tray, a vertical shaft having arms reaching in different directions to the shiftable bottom sections of the trays in the several stacks, and means at the exterior of the incubator for actuating the shaft to simultaneously turn all the eggs in the trays.

3. An incubator embodying an enclosure to house a multiplicity of vertically-spaced egg trays arranged in stacks with the stacks occupying positions side by side for accessibility of the trays through doors in one wall of the enclosure, a shiftable egg-turning bottom section in each tray, vertical shafts to the rear of the tray stacks having forwardly reaching arms with bifurcated ends to engage lugs on the shiftable bottom sections of the trays and permitting disconnection and withdrawal of individual trays without necessity for disturbing others, and means co-ordinating the several shafts for joint operation from the exterior of the incubator to simultaneously turn all the eggs in the trays.

In testimony whereof, I have hereunto signed my name at Tullytown, Pennsylvania, this 20th day of October, 1928.

JOHN F. MacKAY.